(12) United States Patent
Abbott et al.

(10) Patent No.: US 9,112,883 B2
(45) Date of Patent: Aug. 18, 2015

(54) METHOD OF REGISTERING A MOBILE STATION WITH A SOCIAL NETWORKING SITE

(75) Inventors: Martin Jeffrey Abbott, Flemington, NJ (US); Ioannis Tsampalis, New Brunswick, NJ (US); Shelley K. Allen, Basking Ridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1556 days.

(21) Appl. No.: 12/617,131

(22) Filed: Nov. 12, 2009

(65) Prior Publication Data

US 2011/0111737 A1    May 12, 2011

(51) Int. Cl.
| | | |
|---|---|---|
| G06F 15/16 | (2006.01) | |
| H04L 29/06 | (2006.01) | |
| H04L 12/58 | (2006.01) | |
| H04L 29/08 | (2006.01) | |

(52) U.S. Cl.
CPC .......... H04L 65/1073 (2013.01); H04L 12/588 (2013.01); H04L 51/32 (2013.01); H04L 67/04 (2013.01); *H04L 12/5895* (2013.01)

(58) Field of Classification Search
CPC ... H04L 65/1073; H04L 67/04; H04L 12/588; H04L 51/32; H04L 12/5895
USPC ........................................................ 709/217
See application file for complete search history.

(56) References Cited

U.S. PATENT DOCUMENTS

| | | | | |
|---|---|---|---|---|
| 7,308,261 | B2 * | 12/2007 | Henderson et al. | ......... 455/435.1 |
| 8,136,148 | B1 * | 3/2012 | Chayanam et al. | ............... 726/5 |
| 2005/0015505 | A1 * | 1/2005 | Kruis et al. | ................... 709/229 |
| 2005/0086328 | A1 * | 4/2005 | Landram et al. | .............. 709/220 |
| 2005/0268107 | A1 * | 12/2005 | Harris et al. | ................... 713/182 |
| 2006/0253904 | A1 * | 11/2006 | Bhansali et al. | ................. 726/13 |
| 2007/0113090 | A1 * | 5/2007 | Villela | .......................... 713/170 |
| 2008/0097851 | A1 | 4/2008 | Bemmel et al. | |
| 2008/0216153 | A1 | 9/2008 | Aaltonen et al. | |
| 2008/0299970 | A1 | 12/2008 | Roberts | |
| 2009/0249076 | A1 * | 10/2009 | Reed et al. | ..................... 713/181 |
| 2009/0328144 | A1 * | 12/2009 | Sherlock et al. | .................. 726/2 |
| 2010/0262959 | A1 * | 10/2010 | Bruno et al. | ................... 717/171 |
| 2011/0004653 | A1 * | 1/2011 | Cavill et al. | .................... 709/203 |

OTHER PUBLICATIONS

Rosenberg, J. RFC 3680—A Session Initiation Protocol (SIP) Event Package for Registration. Mar. 2004. pp. 1-26.*
European Search Report issued in European Patent Application No. EP 10014574.7 dated Mar. 25, 2011.

* cited by examiner

*Primary Examiner* — John Macilwinen (57) ABSTRACT

A method of registering a mobile station with a website includes the steps of receiving an identification of the mobile station at the website and, determining whether or not the mobile station is already registered at the website, based on the received identification. Upon determining that the mobile station is not already registered, the website interacts with a user of the mobile station to obtain information from the user to register the mobile station and association thereof with the user at the website. Upon completion of registering of the mobile station at the website, a message is sent to the mobile station, indicating the registration of the mobile station with the website.

18 Claims, 6 Drawing Sheets

METHOD OF REGISTERING A MOBILE STATION WITH A SOCIAL NETWORKING SITE

TECHNICAL FIELD

The present subject matter relates to techniques and systems to register a mobile station, for example, a wireless phone, with a website, for example, a social networking site (SNS), via the mobile station itself.

BACKGROUND

In recent years, a mobile station has become a popular interface device to access Internet websites. Specifically, more users of the social networking sites are using mobile stations to access the SNS. Once the mobile station is registered with the SNS, the user can enjoy the SNS contents through the mobile station through application software stored in the mobile station.

However, currently, the user needs to perform initial registration on the website of the SNS from a PC before accessing from the mobile station. This process can be inconvenient to the mobile station user leading to a poor user experience. Ideally, the user should be able to register the mobile station by itself without need to access the SNS from a separate PC.

Hence a need exists for a method of accessing a social networking site through a mobile station and registering the mobile station with the social networking site.

SUMMARY

The teachings herein alleviate one or more of the above noted problems with a method of registering a mobile station with the website. One of the aspects of the present disclosure includes a method of registering a mobile station with a website provided by a server, which comprises the steps of receiving an identification of the mobile station at the website, via a communication through a wireless network serving the mobile station, at the server. The server determines whether or not the mobile station is already registered at the website, based on the received identification. In response to the determination that the mobile station is not already registered with the website, the server may interact with a user of the mobile station, via the wireless network and the mobile station, to obtain information from the user to register the mobile station and association thereof with the user at the website. Upon completion of registering of the mobile station at the website, the server may send a message, via the wireless communication network to the mobile station, indicating the registration of the mobile station with the website.

The message indicating the registration of the mobile station at the website may enable the mobile station to activate a web application program for interacting with the website stored in the mobile station. The server may send, upon the determination that the mobile station is not already registered at the website, a message, via the wireless communication network, to the mobile station, for disabling a web application program for interacting with the website stored in the mobile station.

The received identification may comprise, for example, a mobile directory number (i.e., a telephone number) assigned to the mobile station. The step of receiving the identification of the mobile station may comprise receiving a short message service (SMS) message from the mobile station at the website.

The step of interacting with the user of the mobile station may comprise the steps of sending by the server information enabling the mobile station to display a webpage for registering the mobile station to the website. Mobile station registration information, including a mobile directory number assigned to the mobile station is send back to the website, allowing the server to register the mobile station with the website.

Upon the determining that the mobile station is not already registered at the website, at least one of the server and the mobile station may interact with a user of the mobile station and requests the user to create a new account for the website, for example, a new account for the social networking site. In this case, the mobile station may launch an application program for the user to create the account. It is noted that the mobile station does not have to access the social networking site to create the new account. The application program stored in the mobile station may interact with the server and create the new account.

Another aspect of the present disclosure may include a method of registering a user of a mobile station with a social networking site. The website receives an identification of the mobile station at the social networking site, via a data session through a wireless communication network serving the mobile station. The social networking site determines whether or not the mobile station is already registered at the social networking site, based on the received identification. In response to the determination that the mobile station is already registered at the social networking site, the social networking site may interact with the user of the mobile station, via the wireless network and the mobile station, to determine whether or not the user is registered in association with the mobile station for access to the social networking site. In response to the determination that the user is not registered in association with the mobile station for access to the social networking site, the social networking site may initiates an interaction with the user of the mobile station, via the wireless communication network and the mobile station, to register the user of the mobile station with the social networking site.

Yet another aspect of the present disclosure relates to a system for providing a website service to a mobile station, which may comprise a server and a database. The server may be configured to provide a social networking service through the website. The server may be configured to receive an identification of the mobile station, which may be a mobile directory number assigned thereto, sent by the mobile station through a wireless communication network serving the mobile station, and determine whether the identification is already stored in the database. For a mobile station for which the server determines the identification is already stored in the database, the server may send a first message indicating registration with the website, and for a mobile station for which the server determined the identification is not already stored in the database, the server may send a second message indicating non-registration with the website. The server may be further configured to, for the mobile station for which the server determined the identification is not already stored in the database, send information enabling the mobile station to display a webpage for registering the mobile station with the website, receive registration information including a mobile directory number assigned to the mobile station from the mobile station, and, upon receiving the registration information, register the mobile station with the website. Upon completion of the registration of the mobile station, the server may send the first message.

For the mobile station for which the server determined the identification is already stored in the database, the server may be further configured to send information enabling the mobile station to display a webpage for logging-in the website, and, upon receiving and confirming log-in information, allow the mobile station accessing the website. When sending the information enabling the mobile station to display a webpage for logging-in the website, the server may further be configured to send a user name of the mobile station stored in the database to the mobile station, and upon receiving a message from the mobile station indicating that the user name is incorrect, send information enabling the mobile station to display a webpage for resolving conflict.

In the above disclosed system, the first message may enable a web application program for interacting with the website stored in the mobile station, and the second message may disable a web application program for interacting with the website stored in the mobile station.

Another aspect of the present disclosure may include a mobile station having a processor, a display and a storage medium containing a machine readable program. The machine readable program may cause, when executed by the processor, the mobile station to execute functions for registering the mobile station with one of websites. The functions may comprises designating a website to be accessed; sending unique identification of the mobile station or a user of the mobile station to the website; receiving information indicating registration with the website from the website when the website determines. The steps of designating and sending may be performed automatically upon activation of the mobile station. The functions may further include, upon receiving the information indicating registration, enabling application program stored in the storage medium associated with the website.

As a result, the subject matter of the present disclosure can provide an easy registration method and system for registering a mobile station to a social networking site. Specifically, the user does not need a PC to register the mobile station with the social networking site. Further, the user may create a SNS account without accessing the SNS website.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to registration of a mobile station to a social networking site or other website. Reference now is made in detail to the examples illustrated in the accompanying drawings and discussed below.

Figure 1:
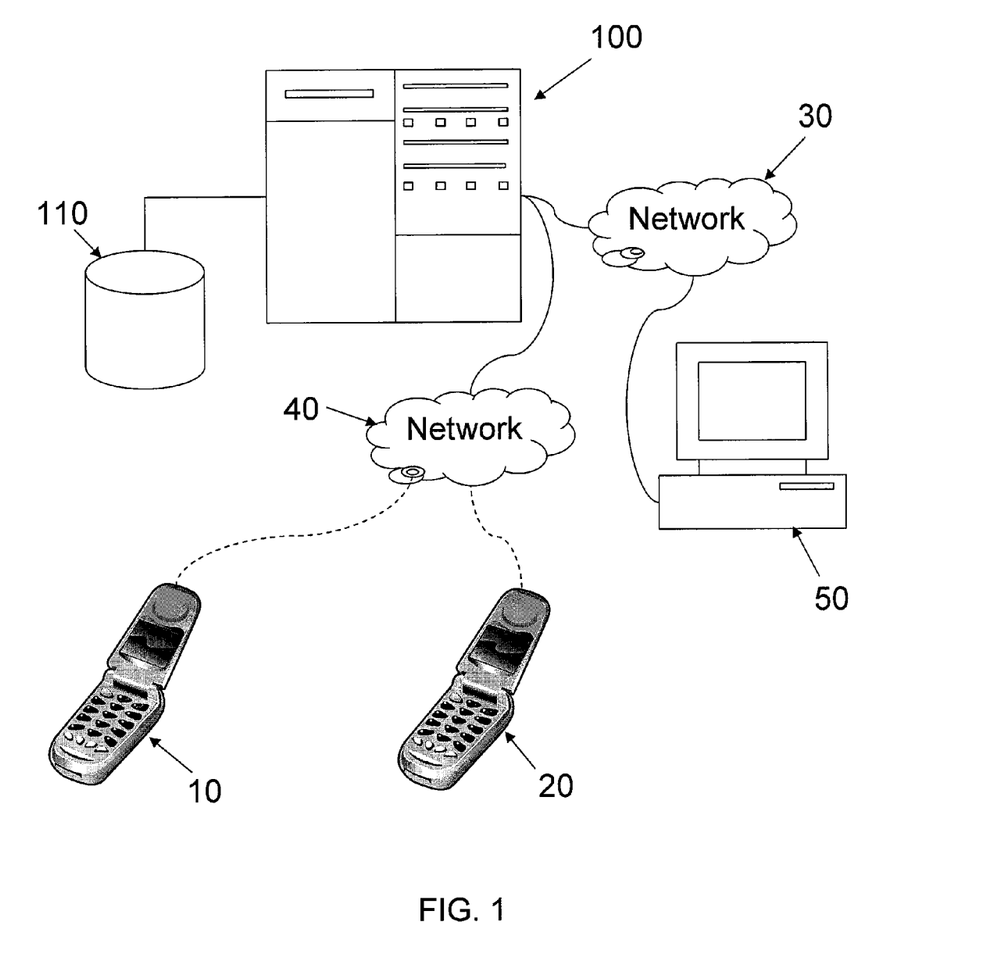
FIG. 1 is an example of the system according to one of the embodiments of the present disclosure.

FIG. 1 illustrates the system for providing a website service to a mobile station according to the present disclosure. The website service, for example, a social networking site is provided by a server 100. The server 100 includes or has access to a database 110, in which user information is stored. The server may be a single computer comprising a storage device storing the database, or may be a group of computers and storage devices. The server provides a variety of SNS services through the networks 30 and 40, for example, the Internet or a wireless communication network to the users.

The user may access the SNS through a PC 50. Generally, the user accesses the SNS through the PC 50 and makes a registration process to become a member of the SNS. In the conventional system, the users are required to register their mobile stations with the SNS before accessing the SNS utilizing the mobile stations. In the present disclosure, however, the users may register their mobile stations 10, 20 to the SNS by utilizing the mobile terminals without using the PC 50.

Figure 2:
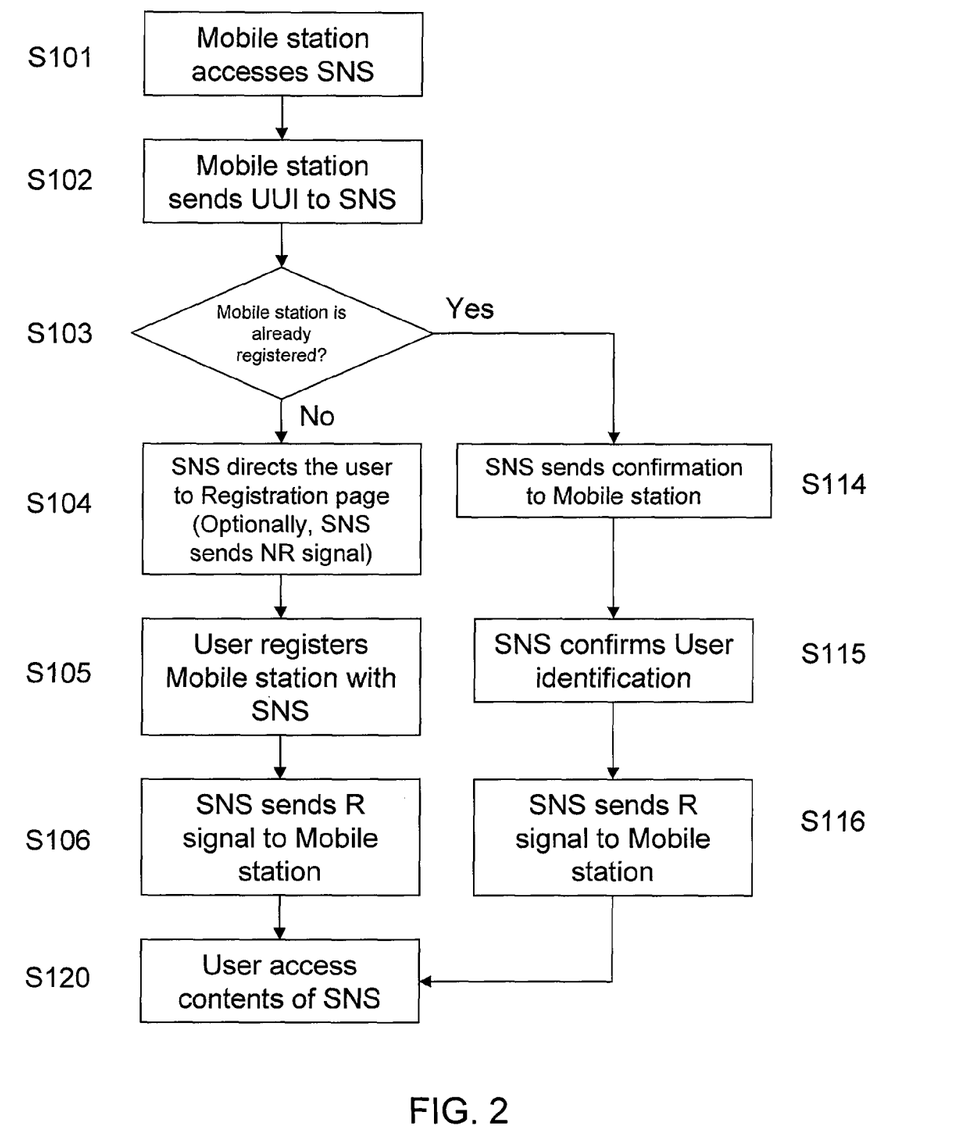
FIG. 2 is an example of the flow chart according to one of the embodiments of the present disclosure.

FIG. 2 illustrates one of the examples of a procedure to register the mobile station with the SNS. The user accesses the SNS website on server 100 and a communication through a wireless network 40 serving the mobile station 10 (S101). To register the mobile station 10, the user sends the identification of the mobile station 10 to the SNS (S102) via the communication through the wireless network 40 serving the mobile station. The identification may be a unique user identification (UUI) including the user's mobile directory number (i.e., a telephone number) assigned to the mobile station 10, information about the device (type of device, UAProf link, etc), any unique identifier of the user stored within the device which may be used as a part of the user's registration process (e.g. email address, an Account Number, etc), the username and/or the password of the user at the SNS or any combination thereof. The identification may be sent automatically by the mobile station 10 to the SNS, if the mobile station is so programmed. In such a case, when the mobile station is turned on (and access to the SNS is available), the mobile station may automatically send the UUI to the SNS to register the mobile station. The identification may be sent manually by an operation of the user. For example, a short message service (SMS) message received from the mobile station at the website may be used to send the identification.

The identification is received by the server 100. Then, the server 100 determines whether or not the mobile station 10 is already registered at the SNS, based on the received identification (S103). For example, the server compares the information (UUI) with registration information stored in the database 110. If the UUI sent from the mobile station does not match any information stored in the database 110, the server may request the mobile station to send another UUI for verification. The request for the additional UUI may be displayed on a browser interface of the mobile station, or sent via the Instant Messaging interface of a data connection (API) interface.

When the server eventually determines that the mobile station 10 has not already been registered with the SNS, the server interacts with a user of the mobile station, via the wireless network 40 and the mobile station 10, to obtain information from the user to register the mobile station and to register the association of the particular mobile station 10 with the user at the website (S105). For example, the server may send information to the mobile station enabling the mobile station to display a webpage for registering the mobile station with the website. The user of the mobile station 10 may input necessary registration information to the webpage. The registration information may include the identification. In formation that the user input and/or information automatically provided by the mobile station is sent back to the SNS server. If the server retains the information received at the steps S102-S103, the registration information may not necessarily include the identification. The user may register the mobile station and create an SNS account without accessing the SNS webpage. In this case, the server may send a request the necessary information for registration to the mobile station and upon receiving the information, create a new account for the SNS.

Upon receiving the registration information, the server 100 registers the mobile station 10 with the website by storing the registration information together with the identification into the database 110. Upon completion of registering of the mobile station at the website, the server may send a message, for example, a flag "R," via the wireless communication network 40 to the mobile station, indicating the registration of the mobile station with the SNS. The flag "R" may contain information identifying the SNS, information indicating the successful registration, or date and time of the registration.

When the mobile station receives the flag "R," a web application program for interacting, accessing and utilizing contents of the SNS stored in the mobile station is enabled (S106). The web application may be downloaded to the mobile station upon completion of the registration. Then, the user can access the contents of the SNS via the mobile station 10 (S120).

Optionally, upon the determination that the mobile station has not already been registered at the SNS, the server may send a message, for example, a flag "NR" indicating non-registration with the SNS, for disabling the web application program (S104). In this case, the web application program is not downloaded to the mobile station.

On the other hand, when the server determines that the mobile station 10 has already been registered with the SNS at step S103 by the initially sent UUI or the additionally sent UUI, the server 100 may send confirmation to the mobile station (S114). To determine whether the mobile station is registered or not, the server may require additional information for verification. The confirmation may include an inquiry asking whether username stored in the database 100 in association with the identification (e.g., mobile directory number) corresponds to the user of the mobile station 10. The confirmation may be a prompt to input log-in information of the user to the SNS. When result of the confirmation is affirmative, then the server allows the user of the mobile station 10 access to the contents of the SNS (S115). At the same time, the server may send the flag "R" to enable the web application program stored in the mobile station (S116). It is possible that the server does not require any confirmation. In such a case, the server utilizes the identification as the log-in information and allows the user to access the contents of the SNS through the mobile station without further requiring information.

If the result of the confirmation is not affirmative, the server may direct the user to resolve the conflict. The user may revise or edit the information stored in the database 110 through the SNS site, and correctly register the mobile station with the SNS.

Figure 4:
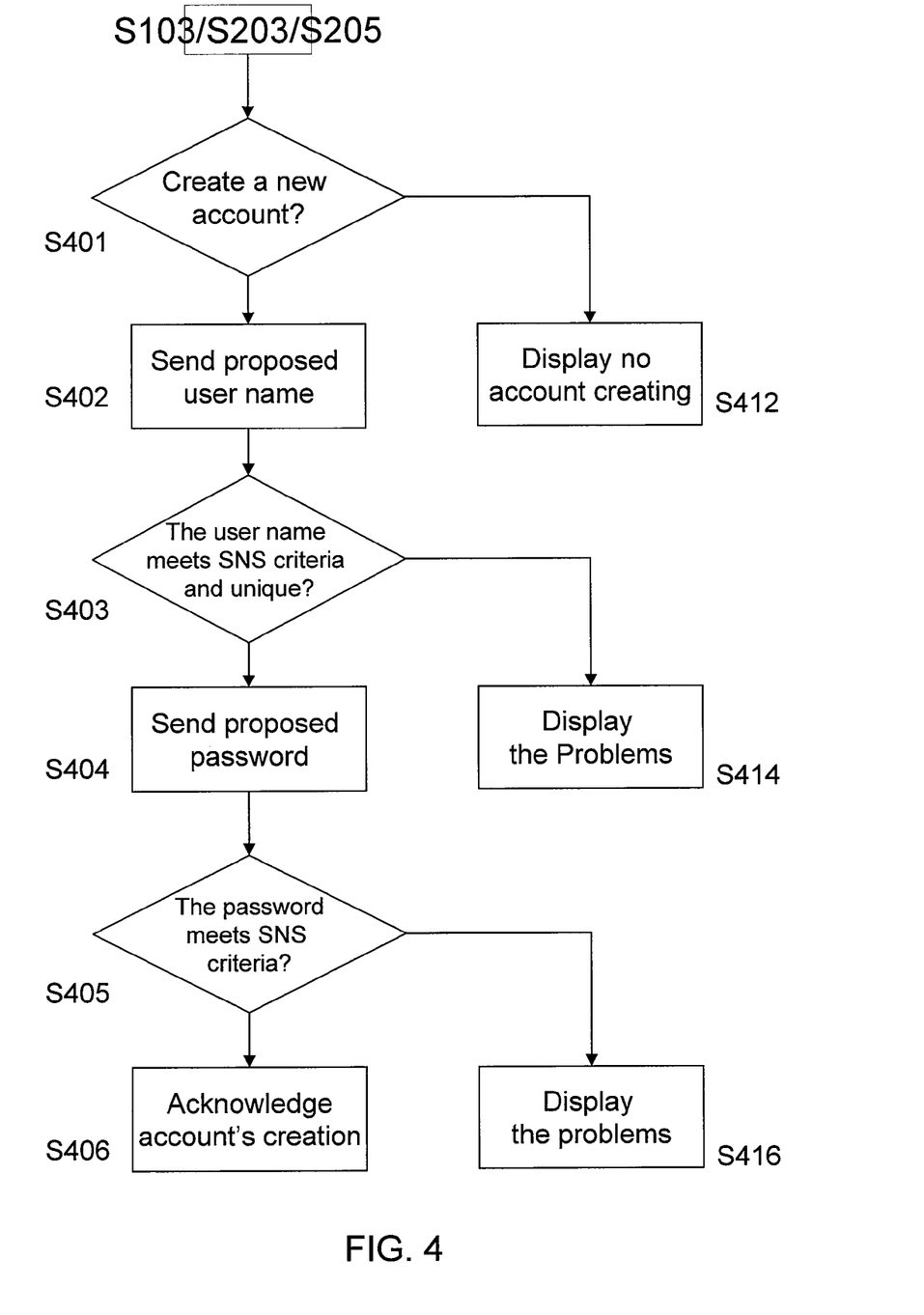
FIG. 4 is an example of the flow chart for creating a new account of the website.

When the user does not have an account at the SNS site, the user may create a new account without accessing the SNS sites. FIG. 4 illustrates a process of creating a new account according to the present subject matter.

When the server determines that the mobile station 10 has not already been registered with the SNS, the mobile station 10 displays an inquiry whether the user wishes to create a new account of the SNS (S401). If the answer is not affirmative, the mobile station 10 may display a message stating no account was created (S412). If the answer at 5401 is affirmative, the mobile station may urge the user to input a desired (i.e., proposed) username. The proposed username is sent via a communication network to the server of the SNS (S402). It should be noted that in this process, the mobile station does not have to access the SNS website, but merely communicate with the server which provide SNS service.

The server determines whether the proposed user name meets the criteria of the SNS and unique (S403). When the determination is affirmative, the server may send such determined result to the mobile station. Then, the mobile station urges the user to input a password, and send it to the server (S404). If the username does not meet the criteria, the server responds to the mobile station with such results, and the mobile station displays the results (S414).

The server determines whether the proposed password meets the criteria of the SNS (S405). When the determination is affirmative, the server may send such determined result to the mobile station. Then, the mobile station displays the creation of the new account (S406). The mobile station may further display the SNS website. If the password does not meet the criteria, the server responds to the mobile station with such results, and the mobile station displays the results (S416).

It should be noted that the proposed username and password may be sent to the server at the same time. Further, this process may be performed by an application program stored in the storage medium (e.g., ROM, RAM or HDD) of the mobile station 10, or may be performed by the server through the mobile station.

Figure 3:
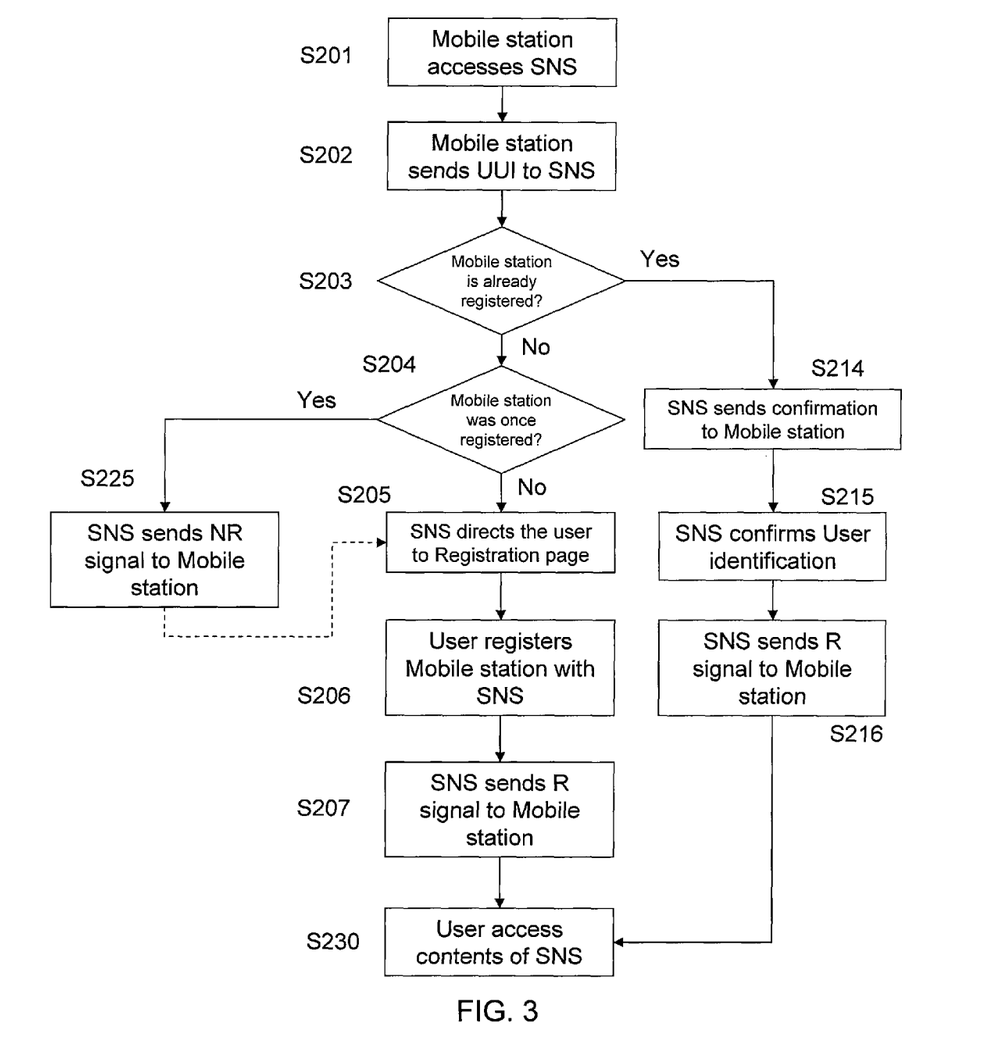
FIG. 3 is an example of the flow chart according to another of the embodiments of the present disclosure.

FIG. 3 illustrates another example of a procedure to register the mobile station with the SNS. In FIG. 3, steps S201-S203 and S214-S216 are the same as steps S101-S103 and S114-S116, respectively, as described above. In this example, the user may have once registered the mobile station 20 to the SNS, but removed the mobile station 20 from the SNS via, for example, a PC 50. In such a case, when the user accesses the SNS with the removed mobile station 20, the server determines that the mobile station 20 has not registered since the identification is not found in the database 110.

After the server determines that the identification (e.g., mobile directory number) is not found in the database 110, the server may further determine whether the identification of the mobile station 20 was once registered and then removed from the database 110 (S204). It should be noted that the database 110 may be able to retain such information. The server 100 then sends a flag "NR" to the mobile station 20 to disable the web application program which may have previously been stored in the mobile station since the mobile station 20 is no longer registered with the SNS (S225).

After sending the "NR" flag to the mobile station 20, the server may direct the user of the mobile station to register with the SNS again (S205). The registration and access processes S206, S207 and S230 are the same as steps S105, S106 and S120. In the step S205, the server may request the user to send an additional unique user identifier (UUI). The server may also request the user to create a new account as explained above with FIG. 4. The server and/or the user may utilize the UUI in a process of creating a new account.

Figure 5:
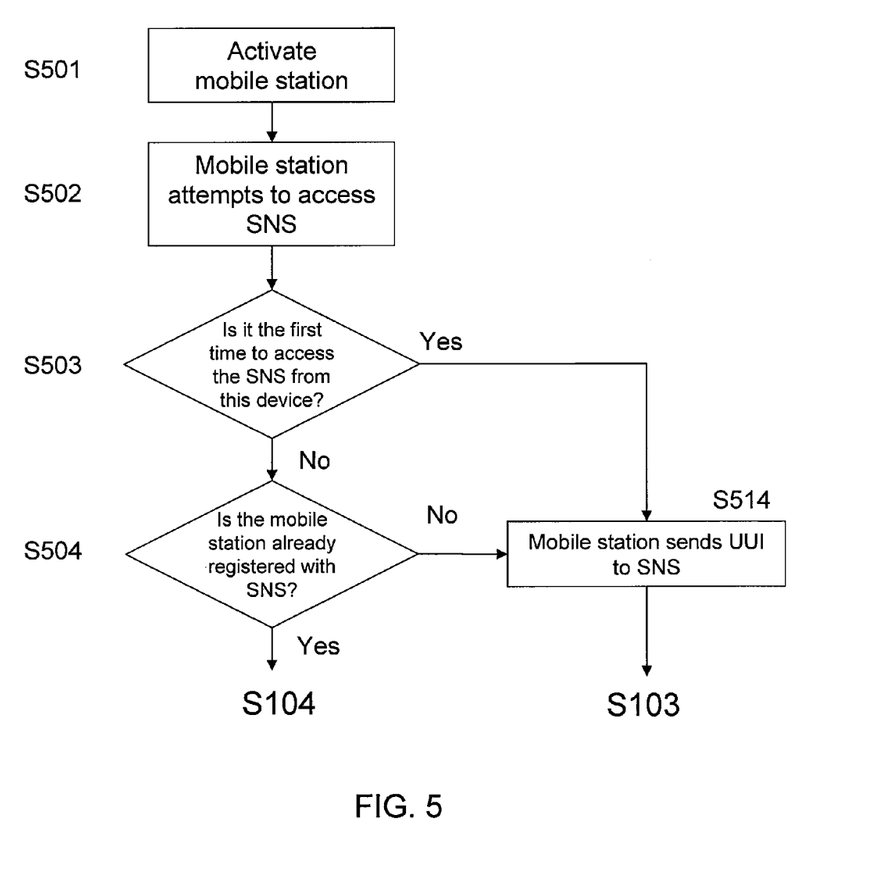
FIG. 5 is an example of the flow chart according to another of the embodiments of the present disclosure.

FIG. 5 illustrates yet another example of a procedure to register the mobile station with the SNS. In this example, the mobile station may check if it is the first time that the social networking site is attempted to be accessed from the mobile station.

Upon activation of the mobile station (S501), or by the user's operation of the mobile station, the mobile station 10 attempts to access the social networking site (S502). The mobile station may be so programmed or configured as to automatically access the specific social networking site (or other website). Or, the mobile station may display plural social networking sites for the user's selection. The user may manually input the address of the social networking site into the browser of the mobile station.

At this time, the mobile station checks if it is the first time that the social networking site is attempted to be accessed from the mobile station (S503). If the result is affirmative, the mobile station may automatically send information to the SNS that includes a unique user identifier (UUI) (S514). In this case, since the mobile station first accesses the SNS, the mobile station may be required to send plural pieces of UUI to the SNS. Then, the server may proceed to the step S103 as shown in FIG. 2.

If, at the step S503, the result is negative, the mobile station determines if the mobile station has been already registered with the SNS (S504). The mobile station may check if it has already received "R" signal from the SNS to determine whether it is registered with the SNS. If the mobile station is not registered with the SNS, the mobile station may send the UUI to the SNS (S514).

If the mobile station has already been registered, the mobile station may proceed to the step S104 as shown in FIG. 2. In this case, since the mobile station is already registered with the SNS, the mobile station may send only one piece of UUI, for example, a mobile directory number. The UUI may be unique information which has been provided by the SNS to the mobile station when the mobile station was first registered. For example, the "R" signal may contain such unique identification information together with the identification of the SNS.

Figure 6A:
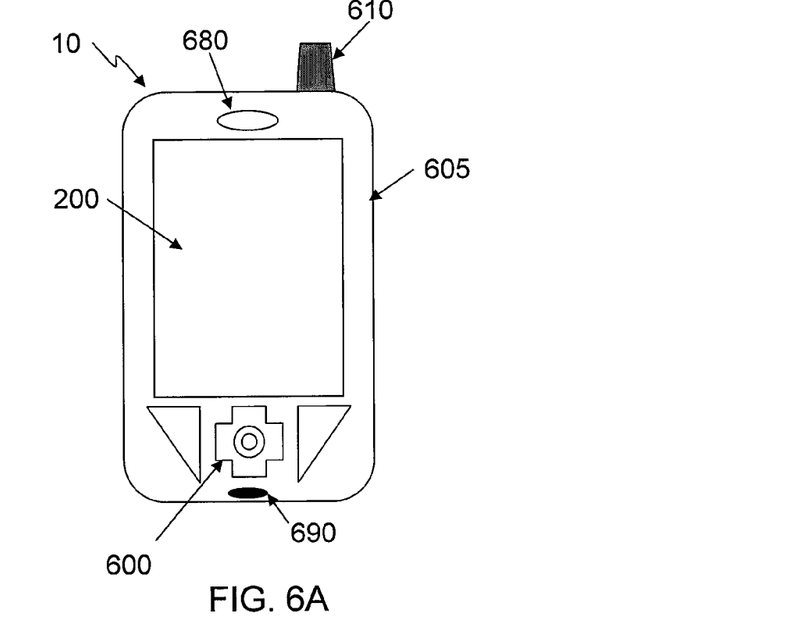
FIG. 6A is an exemplary front view of a mobile station having a touch panel display.

FIG. 6A illustrates the front view of an exemplary mobile station. The mobile station 10, for example, a smart cellular phone, comprises a main body 605, input keys 600, antenna 610, a speaker 680, a microphone 690 and a touch panel display 200. The configuration of these elements is not limited to the arrangement shown in FIG. 66A.

Figure 6B:
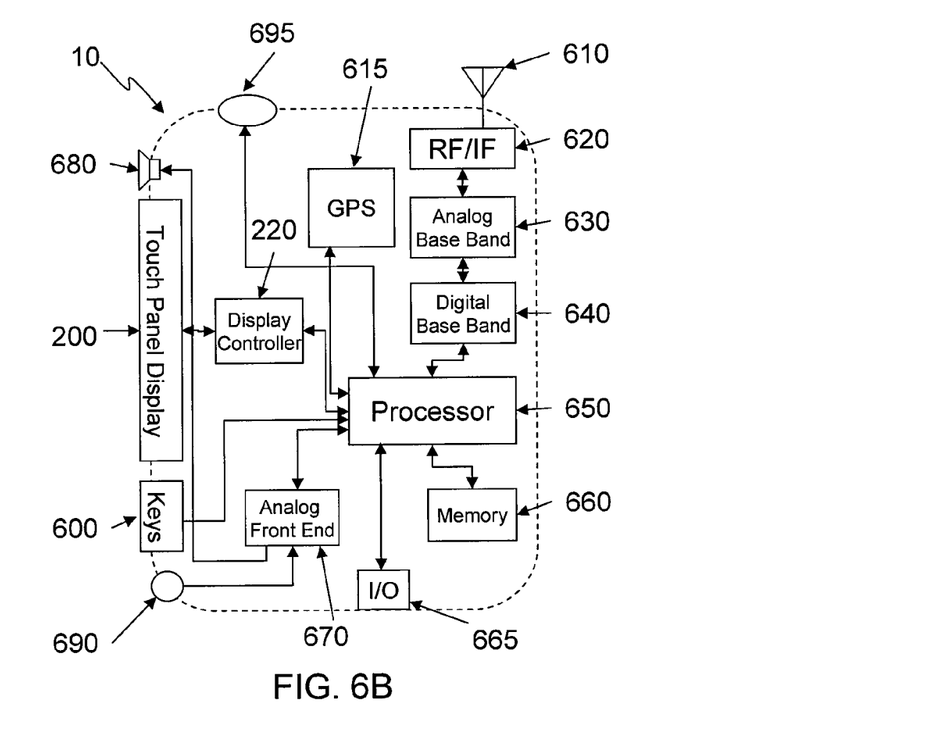
FIG. 6B is an exemplary block diagram of components of a mobile station having a touch panel display.

FIG. 6B shows an exemplary block diagram of elements of the mobile station 10 of FIG. 6A. The mobile station 10, for example, a cellular phone, comprises an RF interface 620 connected to the antenna 610, an analog base band processor 630 and a digital base band processor 640 connected to a processor 650. A display controller or driver 220 is connected to the touch panel display 200 and the processor 650 for controlling the touch panel display 200. An analog front end processor 670 is connected to the processor 650 for controlling the speaker 680 and the microphone 690. The processor 650 in configured to control the display controller 220, RF circuits (620, 630 and 640), the analog front end processor, and an I/O circuit 665. The processor 650 also connects to memory 660 as a storage medium. The memory 660, for example, may comprise a RAM, a ROM or a flash memory. The memory 660 may store any number of application programs. The memory 660 also stores a program which realizes a method for registering the mobile station with the social networking site as disclosed above. The mobile device 10 may further include a GPS receiver 615.

It should be noted that among the above mentioned steps of the present method of registering a mobile station with a website, the steps performed by the mobile station may be realized by a computer program stored in the storage medium (e.g., ROM, RAM or HDD) of the mobile station 10.

One of the advantages of the present subject matter is that the users can register their mobile stations directly with the SNS without using a PC, thereby providing an easier method of registering the mobile stations to the SNS. Another advantage is that the user can create a new account of the SNS without accessing the SNS, thereby providing an easier method of registering the user to the SNS. Yet another advantage of the present subject matter is that since the server can recognize the mobile directory number as the identification, even if the user replaces the mobile station with a new mobile station, the user will still be able to access the contents of the SNS without re-registering the mobile station again as long as the same mobile directory number is assigned to the new mobile station.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of registering a mobile station with a website provided by a server, the method comprising steps of:
   receiving an identification of the mobile station at the website, via a communication through a wireless communication network serving the mobile station;
   the server determining whether or not the mobile station is already registered with the website, based on the received identification;
   responsive to determining that the mobile station is not already registered with the website, performing steps of:
      sending a first message, via the wireless communication network to the mobile station, for disabling a web application program stored in the mobile station and configured for interacting with the website; and
      the server interacting with a user of the mobile station, via the wireless communication network and the mobile station, and independent of the web application program, to obtain information from the user to register, with the website the mobile station and association thereof with the user; and
   upon completion of registering of the mobile station with the website, the server sending a second message, via the wireless communication network to the mobile station, indicating the registration of the mobile station with the website.

2. The method of claim 1, wherein the website is a social networking site.

3. The method of claim 1, wherein the second message indicating the registration of the mobile station at the website enables the mobile station to activate the web application program for interacting with the website, the web application being stored in the mobile station.

4. The method of claim 1, further comprising:
upon the determining that the mobile station is not already registered with the website, the server interacting with the user of the mobile station, via the wireless communication network and the mobile station, to request the user to create a new account with the website by performing steps of:
prompting the user to input a desired user name and a desired password;
receiving a user input of the desired user name and the desired password; and
upon determining the received desired user name and the received desired password meet criteria of the website, completing creation of the new account for the user.

5. The method of claim 1, wherein the received identification comprises a mobile directory number assigned to the mobile station.

6. The method of claim 1, wherein the step of receiving the identification of the mobile station comprises receiving a short message service (SMS) message from the mobile station at the website.

7. The method of claim 1, wherein the step of interacting with the user of the mobile station comprises steps of:
the website sending information enabling the mobile station to display a webpage for registering the mobile station to the website;
the mobile station sending registration information including a mobile directory number assigned to the mobile station to the website; and
the website registering the mobile station with the website.

8. The method of claim 1, wherein:
upon the determining that another mobile station is not already registered at the website, at least one of the server and the other mobile station interacts with a user of the other mobile station and requests the user to create a new account for the website.

9. The method of claim 8, wherein:
the other mobile station is configured to launch another application program for the user to create the account.

10. A method of registering a user of a mobile station with a social networking site, the method comprising steps of:
receiving an identification of the mobile station at the social networking site, via a data session through a wireless communication network serving the mobile station;
the social networking site determining whether or not the mobile station is already registered with the social networking site, based on the received identification;
responsive to determining that the mobile station is not already registered with the social networking site, sending a message via the wireless communication network to the mobile station for disabling a web application program stored in the mobile station and configured for interacting with the social network site; and
initiating an interaction with the user of the mobile station, via the wireless communication network and the mobile station, and independent of the web application program, to register the user of the mobile station with the social networking site.

11. A system for providing a website service to mobile stations, the system comprising:

a server configured to provide a social networking service through the website; and
a database, wherein the server is configured to:
receive an identification of each mobile station sent by each mobile station through a wireless communication network serving the mobile stations, each received identification including a mobile directory number assigned to the respective mobile station sending the identification;
in response to each received identification, determine whether the received identification is already stored in the database;
for a first mobile station for which the server determines the identification of the first mobile station is already stored in the database, send a first message indicating registration of the first mobile station with the website; and
for a second mobile station for which the server determines the identification of the second mobile station is not already stored in the database, send a second message indicating non-registration with the website for disabling a web application program stored in the second mobile station and configured for interacting with the website and send information enabling the second mobile station to display a webpage, independent of the web application program, for registering the second mobile station with the website.

12. The system of claim 11, wherein the server is further configured to:
for the second mobile station for which the server determined the identification is not already stored in the database, receive registration information including a mobile directory number assigned to the second mobile station from the second mobile station, and, upon receiving the registration information, register the second mobile station with the website.

13. The system of claim 12, wherein the server is further configured to, upon completion of the registering the second mobile station, send a message indicating registration of the second mobile station with the website and for enabling the web application program stored in the second mobile station and configured for interacting with the website.

14. The system of claim 11, wherein the server is further configured to:
for the first mobile station for which the server determined the identification is already stored in the database, send information enabling the first mobile station to display a webpage for logging-in to the website, and, upon receiving and confirming log-in information, allow the first mobile station to access the website.

15. The system of claim 14, wherein:
when sending the information enabling the first mobile station to display a webpage for logging-in to the website, the server sends a user name of the first mobile station stored in the database to the first mobile station, and upon receiving a message from the first mobile station indicating that the user name is incorrect, the server sends information enabling the first mobile station to display a webpage for resolving conflict.

16. The system of claim 11, wherein the first message enables a web application program for interacting with the website stored in the first mobile station.

17. The system of claim 11, wherein the second message is sent to the second mobile station for which the server determined the identification is not already stored in the database only when information of the second mobile station was once registered at the website database, but later removed from the website database.

18. A mobile station having:
  a processor;
  a display; and
  a storage medium containing a machine readable program, wherein:
  the machine readable program causes, when executed by the processor, the mobile station to execute functions for registering the mobile station with one of a plurality of websites, the functions comprising:
    designating a website of the plurality of websites to be accessed;
    sending unique identification of the mobile station to the website;
    disabling an application program stored in the mobile station and configured for interacting with the website, in response to receiving from the website a message for disabling the application program when the website determines, based on the unique identification of the mobile station, that the mobile station is not already registered with the website and
    registering with the website, independent of the application program,
  wherein the functions of designating and sending are performed automatically upon activation of the mobile station.

* * * * *